United States Patent
Alam

(10) Patent No.: US 6,278,949 B1
(45) Date of Patent: Aug. 21, 2001

(54) METHOD FOR MULTI-ATTRIBUTE IDENTIFICATION OF STRUCTURE AND STRATIGRAPHY IN A VOLUME OF SEISMIC DATA

(76) Inventor: M. Aftab Alam, 4011 Woodbriar Ct., Sugar Land, TX (US) 77479-2853

( * ) Notice: Subject to any disclaimer, the term of this patent is extended or adjusted under 35 U.S.C. 154(b) by 0 days.

(21) Appl. No.: 09/369,464

(22) Filed: Aug. 6, 1999

Related U.S. Application Data

(60) Provisional application No. 60/109,995, filed on Nov. 25, 1998.

(51) Int. Cl.$^7$ .................................................. G01V 1/28
(52) U.S. Cl. .................................................. 702/16
(58) Field of Search ........................ 702/14, 16, 17; 367/72, 73

(56) References Cited

U.S. PATENT DOCUMENTS

| | | | |
|---|---|---|---|
| 5,251,184 | 10/1993 | Hildebrand et al. | 367/72 |
| 5,563,949 | 10/1996 | Bahorich et al. | 364/421 |
| 5,724,307 | 3/1998 | Higgs et al. | 364/48 |
| 5,995,907 | * 11/1999 | Van Bemmel et al. | 702/16 |
| 6,092,026 | * 7/2000 | Bahorich et al. | 702/16 |

OTHER PUBLICATIONS

Paulson,K. V., Merdler,S.C., Jun. 1968, Automatic seismic reflection picking, Geophysics 33,431–40.

Dalley,R.M., Gevers,E.C.A.,Stampfli,G.M.,Davies, D.J., Gastaldi,C.N.,Ruijtenberg,P.A., and Vermeer G.J.O., Mar. 1989, Dip and azimuth displays for 3–D seismic interpretation, First Break,7, 86–95.

Marfurt,K.J.,Sudhakar,V.,Gersztenkorn,A., Crawford, K.D., and Nissen,S.E.,1997,Coherency calculation in the presence of structural dip,SEG 67th Ann.Int.Mtg. Dallas, Expanded Abstracts, 566–7.

Oliveros,R.B., and Radovich,B.J.,1997,Image–processing display techniques applied to seismic instantaneous attributes over the Gorgon gas field,North West Shelf,Australia,SEG 67th Ann.Int.Mtg.,Dallas, Expanded Abstracts, 2064–7.

Luenberger,D.G., Optimization by Vector Space Methods, 1969, John Wiley & Sons, New York, 172.

Press, W.H., Teukolsky,S.A.,Vetterling,W.T. and Flannery, B.P.,1994,Numerical Recipes in C, The Art of Scientific Computing, 2nd Ed., Cambridge University Press, New York, 572–4

* cited by examiner

Primary Examiner—Donald E. McElheny, Jr.
(74) Attorney, Agent, or Firm—Marvin J. Marnock

(57) ABSTRACT

This invention discloses a method for rapid visual exploration of a volume of seismic data which does not require horizon picking or editing and yet displays all horizons with their stratigraphic features and lithologic variations in 3-D motion on a color graphics workstation. Seismic data is processed to generate multiple attributes at each event, location of a specified phase of the seismic trace, within the 3-D survey volume. Subsets of multiple attributes are interactively selected, thresholded and combined with one out of a suite of mathematical operators into a scalar function which is mapped onto a user selected color spectrum. Three dimensional features, where geological structure and stratigraphic compartments, including those that cannot be detected with conventional techniques, automatically emerge in the 3-D volume as the composition of attributes in the subset, threshold limits of attributes or the mathematical form of operator is interactively varied. By manipulating attribute volume on a graphical workstation, a user visually recognizes bodies of potential hydrocarbon reservoirs, isolates them, identifies their location, and builds a 3-D reservoir model from their structural, stratigraphic and lithologic variations.

7 Claims, 10 Drawing Sheets

(5 of 10 Drawing Sheet(s) Filed in Color)

METHOD FOR MULTI-ATTRIBUTE IDENTIFICATION OF STRUCTURE AND STRATIGRAPHY IN A VOLUME OF SEISMIC DATA

This application claims the benefit of U.S. Provisional Application, Ser. No. 60/109,995, filed on Nov. 25, 1998.

BACKGROUND OF THE INVENTION

1. Field of the Invention

This method is concerned with automated segmentation of geophysical data for the purpose of providing a model of the shapes and properties of earth layers beneath a region of interest.

2. Discussion of Related Art

Geophysical exploration of the earth's subsurface is commonly done by illuminating the subsurface earth layers using suitable radiation. The radiation may be acoustic, electromagnetic, radioactive or of any other nature now known or unknown. During a survey, a radiation source, positioned at or near the surface of the earth, visits a plurality of survey stations arranged in a grid-like pattern over a region of interest. The source is associated with an array of spaced-apart receivers that are responsive to the radiated energy after that energy has passed through and has been filtered and reflected by the subsurface earth layers. At each survey station, the source is activated to allow the respective receivers to record a snap-shot image of a portion of the subsurface in the light of chosen radiation. Each resulting image is digitally recorded on an archival storage medium in the form of a plurality of time-scale traces, usually one trace per receiver group location. Each trace exhibits a series of transients or waveforms in terms of trace amplitude vs. source-to-receiver travel time. On the multi-trace recordings the respective waveforms of the series may be representative of the stratigraphic sequence of a volume of the earth in the vicinity of each survey station, plus unwanted glare or noise.

It is usual practice to arrange the field procedure to allow redundant overlap of adjacent records. Preliminary routine data processing contemplates filtering out the noise, correcting the data for angularity, spherical spreading and sharpening the wavelet imagery using various well-known stacking and multiple-reflection abatement and migration routines.

From the survey, with particular reference to well-known seismic surveying practices by way of example but not by way of limitation, the processed records are merged to produce a 3-dimensional (3-D) image of a volume of the earth in the selected region. To that end, events (locations of a specified phase of waveform) are tracked continuously across adjacent traces and between records by simple inspection, cross-correlation or other well-known means. Each event, representative of a particular geologic horizon or earth layer, is tracked from trace-to-trace and station-to-station to build the desired model of the subsurface earth layers. The desired model may be purely structural to define the limits of a mineral or hydrocarbon deposit. Concomitantly, using attribute methods, some physical characteristic such as the lithology or porosity of a particular rock layer may be mapped.

The interpreted results of a survey may be shown as a topographic map of one or more specific earth layer interfaces or as a sequence of one or more horizontal frames across a data volume, referred to as time slices, to provide subcrop maps.

In a large survey region, it is prohibitively laborious for a human interpreter to follow a plurality of seismic horizons over thousands of stations. The task is preferably relegated to a computer. Several known computer-aided methods of geological interpretation of geophysical data are now presented by way of review. Such methods fall into two categories based on non-uniform- and uniform-time sampling of seismic attributes.

For the first category, Paulson et al., published a paper on horizon tracking entitled Automatic Seismic Reflection Picking, Geophysics v.33, 1968, p431–40. The method first picks the time positions of either all amplitude maxima or amplitude minima on a seismic trace (i.e. a seismic record at one spatial location). This step creates an array of unequally spaced time positions. Second, it uses maximum normalized cross-correlation criterion to match seismic waveform in a time window centered at picked time on one with that in a possibly time-shifted window centered at picked time on a neighboring trace. The continuous trajectory between reflection times in matched windows on contiguous traces is defined as a seismic horizon. Finally, the method associates with each picked time an attribute called grade, which is the product of the length of a trajectory and mean maximum or minimum amplitude along the trajectory. This method was applied to 2-D seismic data since 3-D data did not exist at the time.

Hildebrand et al. in U.S. Pat. No. 5,251,184 issued Oct. 5, 1993, entitled Method and Apparatus for Finding Horizons in 3-D Data, disclose a process that applies one-trace forward and backward search within specified time window and an amplitude tolerance attribute to track horizons in 3-D data. This method is a modification, of Paulson et al. method, where (a) it iterates between forward and backward trace directions among four orthogonally disposed neighbor traces to verify connectivity among picks, (b) it provides an interactive graphical means of introducing a seed point from where the horizon tracking expands laterally, (c) it keeps a history of trajectory expansion starting from the seed point, (d) it enables the user to edit erroneous trajectories, and (e) it displays a tracked cross-section on a graphical screen. Since the seed input and trajectory editing require human intervention, the horizon tracking with this method sets a practical limit on the number of horizons that may be mapped in a given time.

Having tracked one or more horizons over the region, it is of interest to estimate the dip and strike (or azimuth). Dalley et al., in an article entitled Dip and Azimuth Displays for 3-D Seismic Interpretation, in First Break, v. 7, 1989, p86–95, discuss a method for estimating the dip and strike of an automatically tracked or interpreted horizon. The dip and azimuth are spatial (lateral) attributes associated with the tracked horizon time.

The horizon tracking algorithms have problems. First, the tracked horizon (s) sometimes fail to close a loop even on a locally continuous surface. Problems related to loop closure on continuous surfaces include cycle-skipping due to aliasing in the presence of steep dips and inability to extrapolate the horizon across areas of poor record quality. Second, the Hildebrand method requires a seed point to pick a horizon. That is, a human must tell the computer where to start. In this method, since only one attribute—the maximum or minimum amplitude—is used, noise leads to tracking of pseudo horizons especially in areas of poor record quality. Third, both Hildebrand and Dalley methods provide only sparse information confined to particular interpreted horizons out of an entire volume of possible horizons. Fourth, although all horizon tracking based methods provide structural information, i.e., bulk geometrical shapes of horizons, yet they lack stratigraphic and lithologic information, i.e.

detailed subdivisions between boundaries of structural layers and their properties such as porosity or fluids filling the pores. Finally, these methods do not provide any information in regions where horizons cannot be tracked.

For the second category, Taner et al., in a paper entitled Complex Seismic Trace Analysis, Geophysics, v.44, 1979, p1041–63, quantified the character of a seismic reflection through the use of Hilbert Transform to calculate temporal attributes: Instantaneous Envelope, Instantaneous Phase and Instantaneous Frequency. Instantaneous Envelope provides the lithologic component and Instantaneous Phase the structural component of stratigraphy. The first advantage of uniform time sampling based method is that it does not require horizon tracking since attributes are estimated at equal increments of time, unlike the first category methods where attributes are calculated only at unequally spaced horizon picks. The second advantage is that it provides an attribute value even in those regions where a horizon from first category methods does not exist. The disadvantage of Taner's attribute method is that the Instantaneous Phase and Frequency functions become unstable at the minima of the Instantaneous Envelope function. To avoid this disadvantage, Bodine, in a 1984 paper entitled Waveform Analysis with Seismic Attributes, given at the 54$^{th}$ Annual Meeting of the Society of Exploration Geophysicists, proposed averaging the instantaneous attributes in the neighborhood of the peak Instantaneous Envelope. The averages, termed the Response Envelope, Response Phase and Response Frequency were spread over the entire envelope window that embraces several cycles of the seismic waveform. These parameters were more robust than their Instantaneous counterparts but they lacked the required temporal resolution.

The exploration of many geological features, e.g., faults, meandering river channels, reefs and point bars, is not amenable to either Dalley et al.'s dip and azimuth method or Taner et al.'s temporal attributes method. It requires the mapping of various grades of discontinuity.

In U.S. Pat. No. 5,563,949, issued Oct. 8, 1996, entitled Method of Seismic Signal Processing and Exploration, M. S. Bahorich et al. disclose a method of obtaining a set of discontinuity attribute traces distributed over a 3-D volume of the earth. The 3-D volume of input seismic traces is divided into a plurality of vertically stacked and spaced apart horizontal slices. Each slice is divided into a plurality of cells having at least three seismic traces located therein. The maximum time lagged cross-correlation is measured between the first and second traces lying in a vertical plane to obtain an in-line value and another maximum time lagged cross-correlation between the first and third traces lying in the orthogonal vertical plane to obtain a cross-line value. The geometric mean of the in-line and cross-line values is termed 'coherency' associated with the time at the center of the first trace window. Coherency is normalized to lie in the [0,1] interval. The discontinuity attribute is equal to (1-Coherency). This attribute is displayed instead of the seismic time slice on a conventional interpretation workstation. The method works well in areas of gentle dips and low noise, but because it requires an ambient dip and azimuth information it gives false results in areas of steep dips and high noise.

Marfurt et al. at the 67$^{th}$ Meeting of the SEG, 1997, in a paper entitled Coherency Calculation in the Presence of Structural Dip, Expanded Abstracts p566–7, improved upon Bahorich method by first searching for the best estimate of local dip and azimuth, and then calculating coherence along that dipping plane. The Marfurt technique highlights edges of dipping horizons and enhances features within gaps of horizon tracks in the seismic volume and thus complements the horizon tracking procedure that detects only continuous surfaces. However, the method fails in areas of very steep dips that cause spatial aliasing and provides only one attribute 'Coherence', which reveals only one aspect of underlying stratigraphy.

The basic concept underlying the Marfurt technique is similar to Paulson's method with two exceptions. First, Marfurt's method is a uniform time sampling based method. Here the cross-correlation (or Coherency) value is associated with the time at the center of an equally incrementing time window rather than at a peak or trough as in Paulson's method. Second, it uses normalized cross-correlation itself as an attribute unlike the Paulson method which calculates cross-correlation to connect peaks or troughs on neighbor traces but uses the product of trajectory length and mean amplitude as the attribute. The normalized cross-correlation is a more useful attribute to measure similarity between spatially separated and dipping trace windows.

In U.S. Pat. No. 5,724,309, issued Mar. 3, 1998, W. G. Higgs et al. disclose a method to estimate dip and azimuth from spatial derivatives of Instantaneous Phase. Unlike Dalley et al., it is a uniform time sampling method. In comparison with the first step in Marfurt method, this method directly provides the highly desirable dip and azimuth attributes without a compute-intensive dip search. This method too, however, suffers from false results in areas of high noise or spatial aliasing due to steep dips.

The problems of storage, fast access, and graphical rendering of multiple attribute volumes become more severe with each additional attribute. Oliveros et al., at the 67$^{th}$ Meeting of the SEG, in a paper entitled Image-Processing Display Techniques applied to Seismic Instantaneous Attributes over the Gorgon gas field, North-West Shelf, Australia, Expanded Abstracts p2064–7, suggest combining 3 attributes by assigning them to govern hue, lightness and saturation in a single color display. This method does not solve the data logistics problem and limits to three the number of attributes that can be visualized at any one time.

To summarize existing known methods for automated interpretation of geophysical data: Horizon tracking requires undesirable extensive human intervention to pick seed-points and edit trajectories. Inconsistent horizon tracks may result due to the use of but a single temporal attribute such as a minimum or maximum amplitude which per se is not uniquely diagnostic of the inter-trace identity of a horizon. Dip and azimuth estimates are restricted to interpreted horizons. Temporal waveform analysis as exemplified by Taner et al. becomes unstable in certain situations and lacks spatial resolution. The Bodine technique of Response Attributes is more stable but it lacks the temporal resolution which is so important in stratigraphic analysis. Coherence and uniformly sampled Dip-Azimuth techniques provide spatial resolution but reveal only one aspect of stratigraphy and fail in the presence of spatial aliasing and noise. Multiple attributes from uniform time sampling suffer from problems of large volume data logistics and visualization. Displays of processed data show either a 3-D volume of a single attribute or a multiple-attribute classification painted in color on a 2-D structural map of a horizon. None of above methods allows a user to take advantage of several attributes and view the joint response in a volume. All methods are fraught with problems of poor loop closure, cycle-skipping in the presence of steep dips and false results in areas of severe noise. In effect, the interpreter of geophysical data must perform many steps, each providing one piece of the structural or stratigraphic puzzle. The interpreter must then synthesize the pieces into a whole picture while remaining aware of the pitfalls.

There is a need for an all-inclusive, cost-efficient, automated process that relieves the user of the need for human-intensive horizon interpretation, editing and mapping. The process should estimate the temporal, spatial and statistical attributes that allow the resolution of the fine structure and stratigraphy of the seismic volume as a whole rather than confining them to a selection of mapped horizons. The process should require modest computer memory and storage resources. And it must offer the user interactive means for speedily and economically exploring the structure and stratigraphy in a "what if" sense having available many combinations of attributes to classify, visualize, and locate hydrocarbon reservoir targets directly in three-dimensional displays.

SUMMARY OF THE INVENTION

The invention is a computer-aided method to explore, locate, and identify the structure and stratigraphy of the earth's subsurface by processing and visualizing a waveform data volume formatted as a plurality of digitized time-scale or depth-scale traces wherein the data are gathered from a corresponding plurality of data measurement stations distributed in a grid pattern over a region of survey. A plurality of events is identified on each trace, wherein an event is the occurrence of a specified feature of a waveform. A maximum amplitude feature is used here to designate an event by way of an example. In general, it could be a minimum, zero-crossing on the rise of amplitude, zero-crossing on the fall of amplitude or any other recognizable phase of the trace. A plurality of temporal attributes is derived to characterize the waveform in a short time window that contains the event and to associate it with the time of occurrence of the event.

A small subvolume of time-windowed traces, each containing multiple events, is circumscribed around each event as center. A scalar mathematical functional, Event Dissimilarity, is derived to measure dissimilarity by combining temporal attribute differences between the center event and each event on laterally separated traces within said subvolume. The event with the least Event Dissimilarity on a trace is called the 'most similar event' for that trace. A smooth approximating surface, the local wavefront, is estimated such that it passes exactly through the time at the center event and best fits the times of most similar events on laterally separated traces. The time misfit error statistics, for example, the mean and variance of time residuals between the actual event time and local wavefront time at each trace in said subvolume is calculated. A 'local attribute surface' is estimated for each attribute in a manner similar to the estimation of local wavefront. Each local attribute surface passes exactly through the value of that attribute at the center event and best fits the value of the same attribute at each event whose time is in closest proximity to the local wavefront. A misfit error is then calculated for each attribute. Parameters of the local wavefront, time misfit error, each local attribute surface and corresponding attribute misfit error are collectively called spatial attributes. A superset of N attributes, combining both the temporal and spatial attributes, characterizes a volume of waveform in the neighborhood of the center event. The procedure maps a 3-dimensional event at (x, y, t) into an N-dimensional attribute space.

Any subset of individually normalized attributes is then selected and combined on a graphical workstation into a functional, called indicator functional, with its range of values mapped in a color spectrum. The resulting 3-D display automatically shows geological structures as locus of point sets and stratigraphic compartments as color variations within point sets. The same color in spatially separated anomalies indicates that the anomalies share common features characterized by the threshold range and mix of individual attributes in the indicator functional. Further, on a workstation equipped with sound, two or more subsets of N attributes instead of one are combined into indicator functionals with functional values of one displayed in color and those of others played as sounds of varying audio-frequency tone and volume.

DESCRIPTION OF DRAWINGS

The file of this patent contains at least one drawing executed in color. Copies of this patent with color drawing (s) will be provided by the Patent and Trademark Office upon request and payment of necessary fee.

Figure 11:
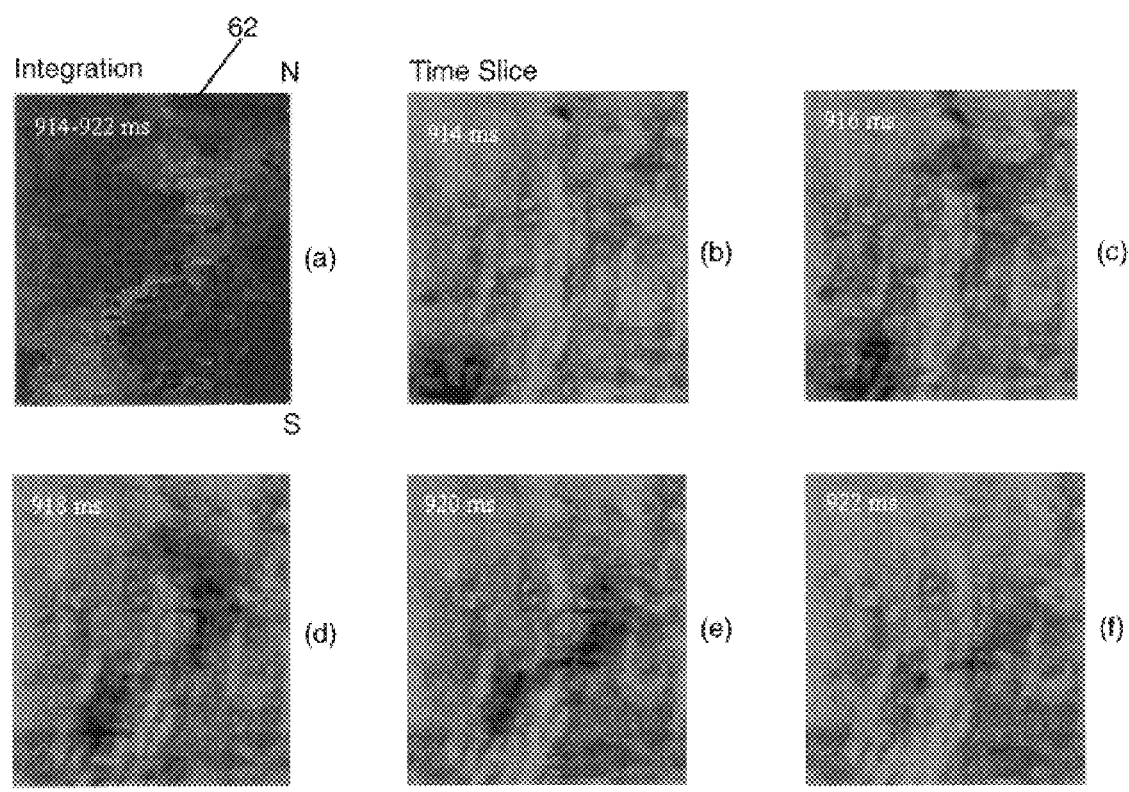
FIG. 11(a) is a map view color display of an attribute combination selected by the user interface in FIG. 10 after vertical integration over an 8-ms time window.
FIGS. 11(b)–(f) shows a sequence of conventional time slices for the purpose of comparison.
Figure 13:
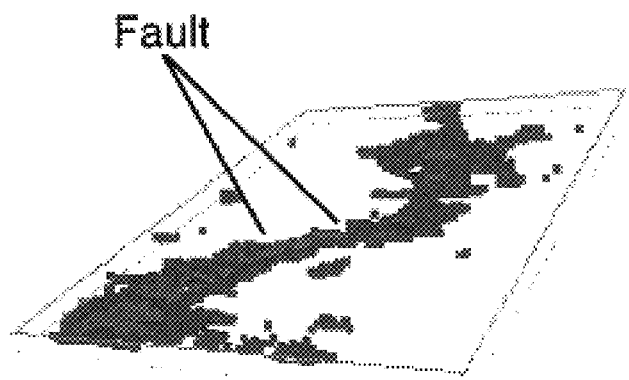

wherein the attribute displayed is integrated spatially over a west-east sub-interval and viewed from the west;

FIGS. 12(b)–(c) displays conventional seismic sections of the west edge and the east edge of the integration interval wherein both sections are viewed from the west;

FIG. 13. is a perspective view of combined attribute display, 62, of FIG. 11 wherein a histogram filter has been applied to remove the blue color, thereby providing sharp discrimination among feature details.

DETAILED DESCRIPTION OF THE INVENTION

The novel features which are believed to be characteristic of the invention, both as to organization and methods of operation, together with the objects and advantages thereof, will be better understood from the following description including the drawings, which are not necessarily to scale, wherein the invention is illustrated by way of example for the purpose of clarity of description only and is not intended as a definition of the limits of the invention.

The following terminology will be used in this embodiment:

A trace, identified by surface location (x, y), is a fixed length sequence of waveform amplitude samples digitized at equal time (or depth) increments.

A wave packet is the portion of a waveform contained between consecutive minima of the instantaneous envelope function derived from the trace and its Hilbert Transform. These locations also coincide with discontinuities in the instantaneous phase trend or spikes in the instantaneous frequency function.

An event, identified by (x, y, t), is the time of a specified amplitude feature or the time of a specified phase of the waveform, which may be the input trace or its mathematical transform such as instantaneous envelope function. The specified feature may be a maximum, minimum, zero-crosssing on the rise or fall, or any other identifiable feature of the waveform.

A temporal attribute, $A_i(x,y,t)$ of an event is a parameter derived from a mathematical operation on the uniformly sampled temporal waveform in a window enclosing the event at time 't' on trace (x, y).

A spatial attribute, $A_j(x,y,t)$ of an event is a parameter derived from a mathematical operation on functional values of laterally separated traces within a spatial subvolume centered at said event (x, y, t).

A time gradient to a local wavefront is the spatial gradient to the surface that passes through the time of event (x, y, t) and best fits time of events that are most similar to said event and laterally separated within a small subvolume that is centered at said event.

An attribute gradient is the spatial gradient of the surface that passes through an attribute at center event and best fits the same attribute of events that are in close proximity of the local wavefront on laterally separated traces within a small subvolume enclosing the center event.

A normalized attribute gradient vector is a normalized set of attribute gradients corresponding to a specified set of attributes.

A superset comprising the union of normalized temporal and spatial attributes, and normalized time gradient to local wavefront, $A_1, \ldots, A_N$ is associated with the event, (x, y, t), so that a 3-dimensional point in the seismic volume is mapped into an N-dimensional point in the attribute space.

This invention comprises 10 principal steps. First, model a seismic volume as a collection of events in a 3-dimensional (x, y, t) space, called domain D. In the case of a regularly sampled 3-D data, these events are indexed equally in the x- and y-directions, although the space interval between indices may be different for each direction. Event sampling in the time t-direction is generally sparse and unequally spaced. Second, associate with each event a number, N, of attributes, denoted by the vector A. Third, normalize each attribute in the [0,1] interval. This process maps said 3-dimensional domain to an N-dimensional L1-normed attribute range. The absolute value attribute norm, L1, is used for computational efficiency, but does not limit the application of the method, which is valid for any norm. Fourth, if depth instead of time is used to analyze spatial continuity of an event, said (x, y, t) space is scaled by an appropriate velocity to represent actual distances in the three directions. This space is L2-normalized and labeled as a new (x, y, z) coordinate system with Euclidean norm. The continuity of an event is then quantitatively analyzed in terms of Frechet derivatives, taught by D. G. Luenberger, p. 172–5.

Fifth, interactively threshold and combine any subset of attributes via a spatial, arithmetic, logical or morphological operation into an indicator functional, which is again normalized to [0,1] interval. Sixth, map the normalized interval to a user selected color spectrum on a graphical workstation. Seventh, render events as points in the 3-D survey volume, and assign to each point the color that represents the indicator functional value of the event, as for example the average of normalized amplitude and normalized peak-to-trough amplitude difference. The three dimensional display shows geological structures as loci of events, and stratigraphic compartments as patterns of colors. Eighth, remove unwanted regions in the volume by the use of a histogram filter. Ninth, select a thin slab whose face is parallel to one of the three principal planes and integrate the indicator functional over the thickness of the slab. Animate the slab in a direction perpendicular to the face of the slab with target anomalies moving into and then out of the viewing range. Apply a similar animation process to the rotation of either the entire volume or a small subvolume, wherein the integration is performed along arcs in a small angular wedge through the axis of rotation. Tenth, locate with a graphical cursor any isolated anomaly and output the result as a hardcopy plot or archival file.

Figure 1:
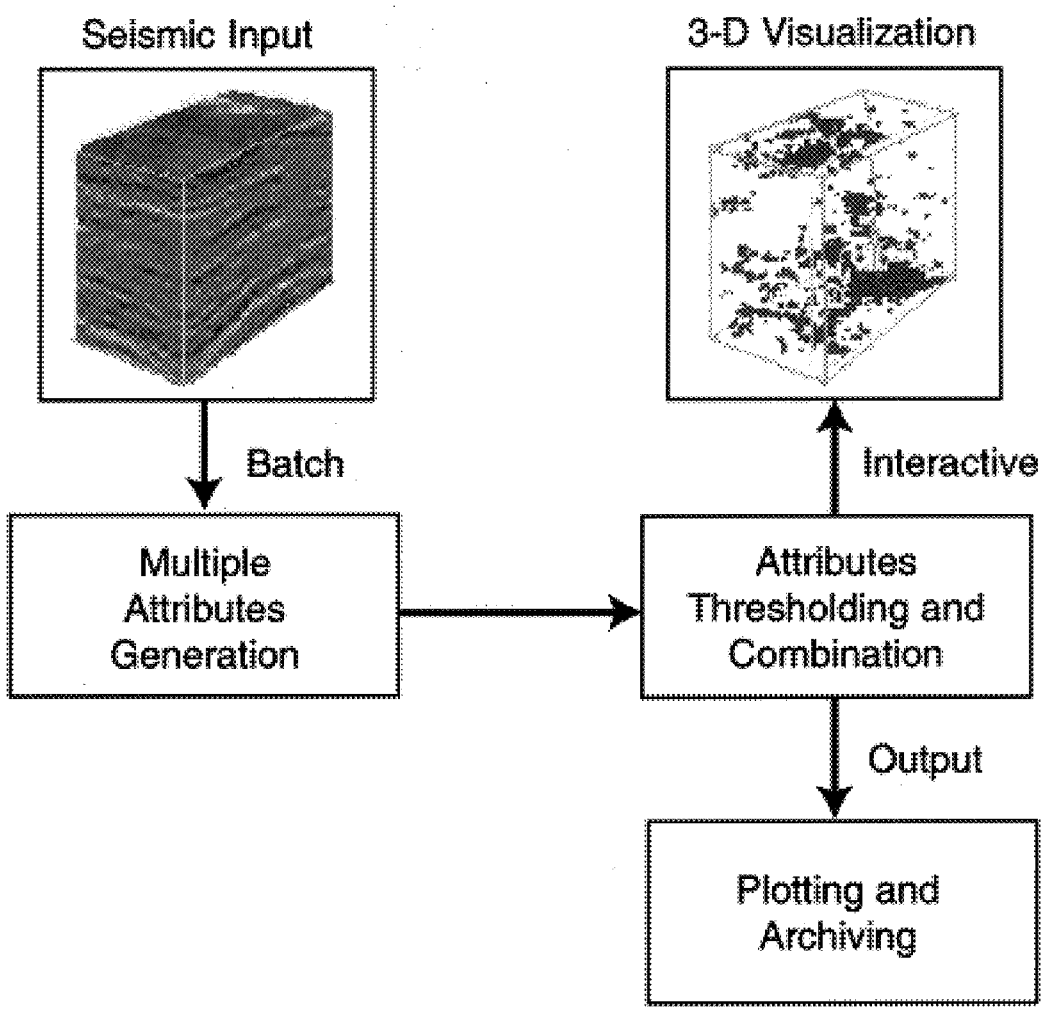
FIG. 1. is a block diagram for illustrating the process flow of the invention for multi-attribute identification of structure and stratigraphy in a volume of seismic data.
Figure 2:
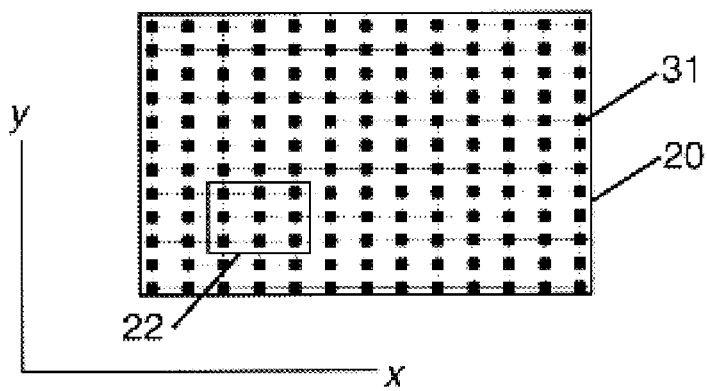
FIG. 2. shows a grid map of a seismic survey region wherein location indices are (x,y) coordinates.
Figure 3:
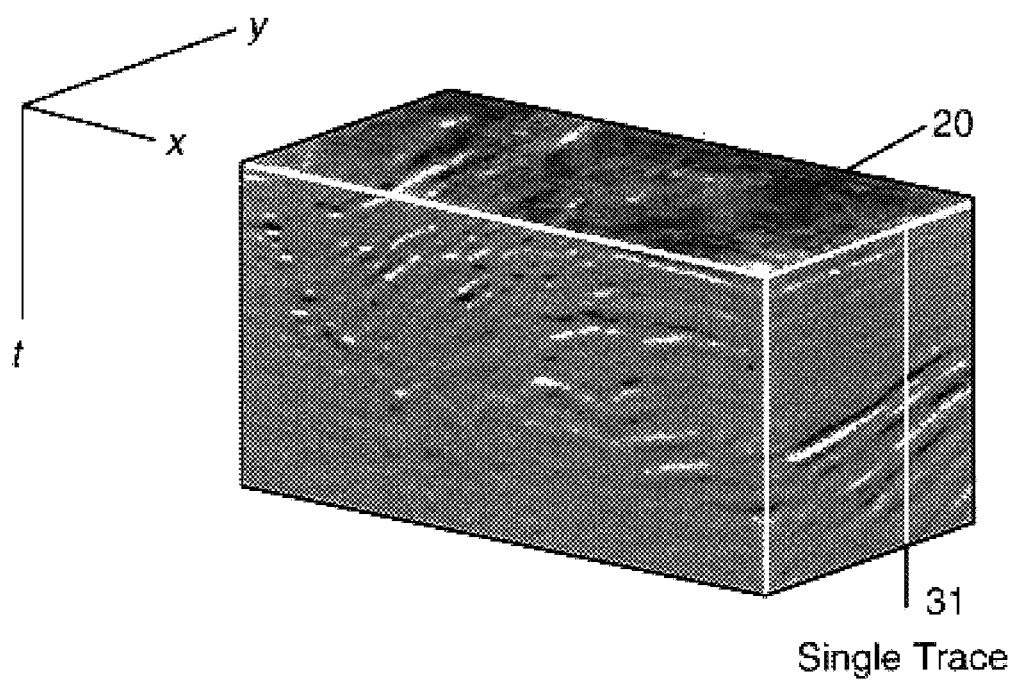
FIG. 3. illustrates a three dimensional view of a set of seismic traces to which this invention may be applied and wherein digitized seismic signal values as a function of the time index t appear on a continuous gray scale between shades of white representing (+) values and black (−) values.

Referring to the drawings, FIG. 1 shows a process flow of this invention. A seismic volume is input and detailed 3-D structural and stratigraphic features of a selected few or all events with color separating the property of each feature are output. FIG. 2 shows a grid map of the survey over the region 20. A point on the grid node, 31, is identified by discrete indices x and y. At each grid point, 31, exists a digitally sampled trace representing seismic signal as a function of discrete time, index t. FIG. 3 illustrates a collection of such traces in the rectangular volume over the survey region, 20, wherein a single trace is located at grid node 31.

Wave Packet

Figure 4:
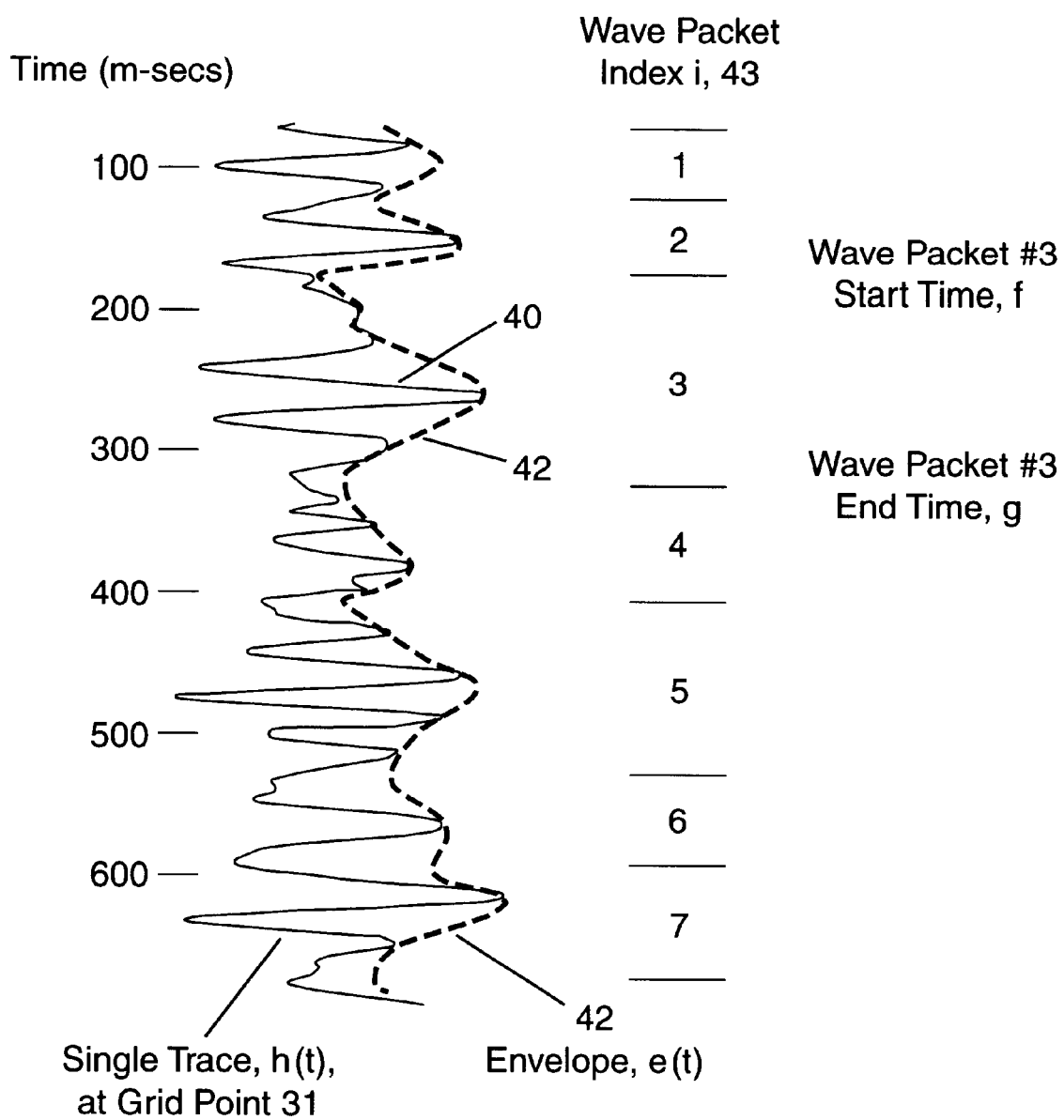
FIG. 4. depicts a single seismic trace obtained from the survey region of FIG. 2 wherein the traces are plotted as a wiggly excursion about a null position instead of white and gray shades and wherein a plurality of wave packet time boundaries for the trace are delineated.

FIG. 4 is a detailed plot of the single signal trace, h(t), at grid node, 31. The process calculates from the trace and its Hilbert Transform the instantaneous envelope 42, e(t), instantaneous phase, φ(t), and instantaneous frequency, ω(t). In this invention, troughs of the envelope function e(t) are used to define boundaries of the wave packet, identified by the index i, 43. The trough boundaries also coincide with locations where the instantaneous frequency has spikes and instantaneous phase has discontinuities. After detecting each wave packet boundary on a trace the process cuts the trace into contiguous wave packets which begin at one and end at the next boundary. The index i, 43, varies over the plurality of wave packet segments that make up the signal trace, h(t), at grid location 31. For brevity, the qualifying word 'instantaneous' will be dropped henceforth and references to the envelope, frequency, and phase functions will imply that they are instantaneous functions.

Event

Figure 5:
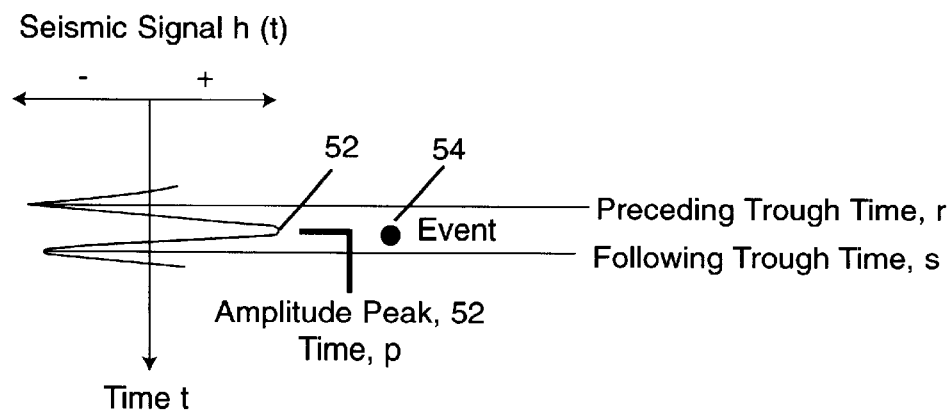
FIG. 5 illustrates graphically a seismic signal function, h(t), from which the time, p, of the peak amplitude, 52, is selected as the event, 54, within the wave packet shown in FIG. 6.
Figure 6:
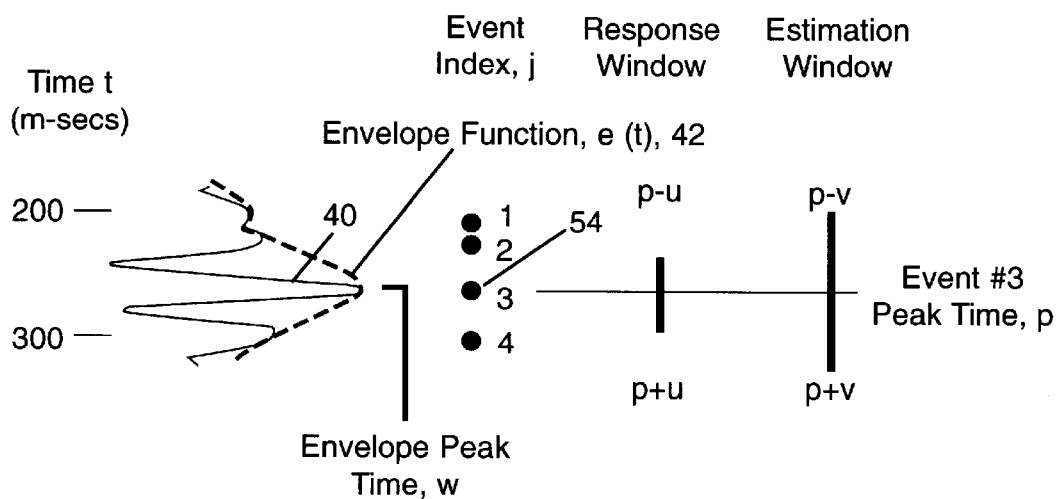
FIG. 6. Shows the wave packet, index i=3, and a corresponding segment of the trace, 31, within the envelope function, 42, shown in FIG. 4.

In the beginning of the process a selection is made to define the waveform, for example the input trace itself or its mathematical transform, and the phase of an event. The event could be the time location of a peak, trough, zero-crossing on the rise, zero-crossing on the fall of amplitude or any other readily recognizable phase of the waveform. By way of example, however, an event implies the time location of a peak throughout this embodiment. FIG. 5 shows an event, 54, which is a peak, 52, of the signal trace, h(t), with troughs preceding and following it. FIG. 6 illustrates a portion, 40, of the trace, h(t), that is contained within the wave packet with instantaneous envelope, 42, and identified by wave packet index, i=3, in FIG. 4. This wave packet contains 4 events, identified by the index j and includes the event 54.

Figure 7:
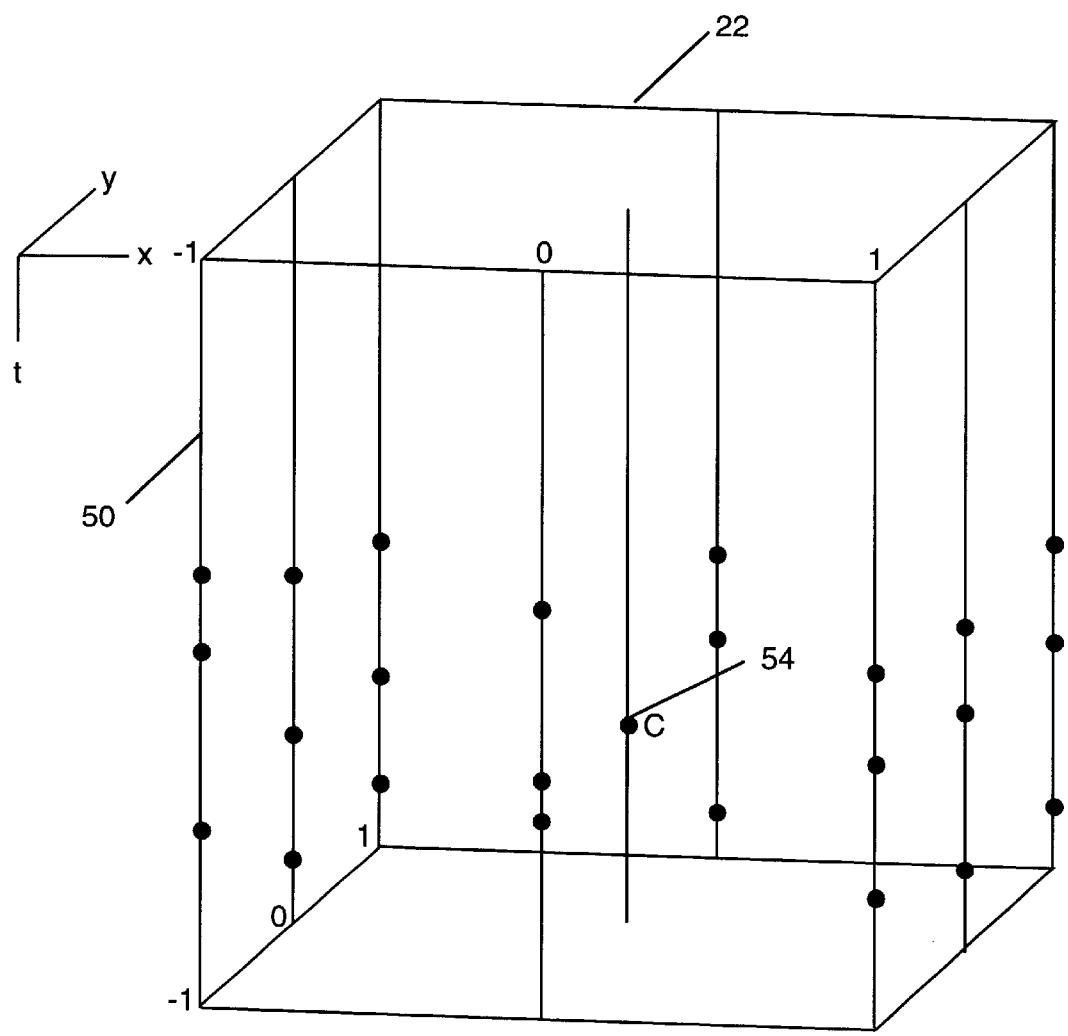
FIG. 7. displays a three dimensional view of a matrix cube, 50, of events including the central event C, 54, present on seismic signal traces in a 3×3 surface grid identified by a rectangular enclosure, 22, in the survey map of FIG. 2.

An event in the seismic volume is identified by its grid location (x, y), and event time t. The time variable, t, is further subdivided for the purpose of attribute calculation into a wave packet index i, and the event index j. Next steps in the process are to associate with each event a number of attributes derived from windows that contain the event. Such windows include temporal windows, for example, the interval between wave packet start and end times (FIG. 4), Response Window (FIG. 6), Estimation Window centered on the time of event 54, (FIG. 6), and spatial attributes derived from a lateral window, 22, centered at the grid location of the event 54, indicated by C in (FIG. 7). The set of attributes formed by the union of temporal and spatial attributes is represented as a vector whose k-th component is denoted as $A_k(x,y,i,j)$.

It is to be noted that the decomposition of the time, t, into a wave packet index, i, and an event index, j, within that wave packet is done for computational convenience but does not change the dimension of the domain, D, which remains to be three and identified by the (x, y, t) coordinates.

Temporal Attributes

Temporal attributes are calculated over different lengths of time windows containing the event, 54, in FIG. 5.

Point Attributes

Attributes in vector elements, A1, ..., A6, are identified within a one-period long window in FIGS. 4 and 5, as follows:

Time of the peak, 52:

$$A_1(x,y,i,j)=p$$

Amplitude of the peak, 52:

$$A_2(x,y,i,j)=h(p)$$

Time difference between the peak, 52, and preceding trough:

$$A_3(x,y,i,j)=p-r$$

Amplitude difference between the peak, 52, and preceding tough:

$$A_4(x,y,i,j)=h(p)-h(r)$$

Time difference between peak, 52, and the following trough:

$$A_5(x,y,i,j)=s-p$$

Amplitude difference between the peak, 52, and the following trough:

$$A_6(x,y,i,j)=h(p)-h(s)$$

Wave Packet Attributes

Attributes in vector elements, A7, ..., A10, are identified in FIGS. 4 and 6, as follows:

Time difference between peaks of trace 40 and of the corresponding envelope function 42 establishes the time offset between event 54 and location of its wave packet in FIG. 6:

$$A_7(x,y,i,j)=p-w$$

Time of the peak of envelope 42:

$$A_8(x,y,i,j)=w$$

Time difference between the peak of envelope 42 (FIG. 6) and start of wave packet #3 (FIG. 4):

$$A_9(x,y,i,j)=w-f$$

Time difference between the end of wave packet #3 and the peak of envelope 42:

$$A_{10}(x,y,i,j)=g-w$$

Response Attributes

Attributes in vector elements, A11, ..., A15, are calculated with reference to FIG. 6. These are averages over a short time window of (2u+1) samples centered at a point, for example the envelope peak or trough. They are estimated as follows:

Response Envelope Amplitude at the peak of envelope 42:

$$A_{11}(x,y,i,j) = \left(\frac{1}{2u+1}\right)\sum_{t=-u}^{u} e(w+t)$$

Response Envelope Amplitude difference between the peak of envelope 42 and the trough at the start of wave packet #3:

$$A_{12}(x, y, i, j) = \left(\frac{1}{2u+1}\right)\sum_{t=-u}^{u} [e(w+t) - e(f+t)]$$

Response Envelope Amplitude difference between the peak of envelope 42 and the trough at the end of wave packet #3:

$$A_{13}(x, y, i, j) = \left(\frac{1}{2u+1}\right)\sum_{t=-u}^{u} [e(w+t) - e(g+t)]$$

Response Phase at the peak of envelope 42:

$$A_{14}(x, y, i, j) = \left(\frac{1}{2u+1}\right)\sum_{t=-u}^{u} \phi(w+t)$$

Response Frequency at the peak of envelope 42:

$$A_{15}(x, y, i, j) = \left(\frac{1}{2u+1}\right)\sum_{t=-u}^{u} \omega(w+t)$$

Waveform Reconstruction Attributes

Attributes in vector elements, A16, ..., A19, parameterize shapes of the envelope and phase functions in a wave packet. The residuals between the actual values and those predicted by parameters are used to define high resolution detail within a wave packet. The difference between discrete sample times, t, within the wave packet and the time of the envelope peak is the relative time:

$$\tilde{t} = t - A_8$$

The envelope function is modeled as a cubic polynomial of the relative time:

$$\hat{e}(\tilde{t}) = A_{11} + A_{16}\tilde{t} + A_{17}\tilde{t}^2 + A_{18}\tilde{t}^3$$

The parameters, A16, A17, and A18, are estimated such that the polynomial is constrained to pass through response envelope values at the wave packet start- and end-times and minimizes the sum of squared residuals, $$\sum_{\tilde{t}=-A_9}^{A_{10}} [e(\tilde{t}) - \hat{e}(\tilde{t})]^2$$

Similarly, the phase is modeled as a quadratic function of the relative time and the parameter, A19, is calculated to minimize the sum of squared residuals, $$\sum_{\tilde{t}=-A_9+1}^{A_{10}-1} [\phi(\tilde{t}) - A_{14} - A_{15}\tilde{t} - A_{19}\tilde{t}^2]^2$$

Notice that the upper and lower limits in the summation are set to exclude times at the start- and end- of the wave packet where the frequency function generally has spikes.

From the attributes, $$A_8, \ldots, A_{19}$$

a person skilled in the art can apply the formulae used in Waveform Reconstruction Attributes estimation to reconstruct an approximation to the waveform in the original wave packet.

Estimation Window Attributes

Attributes in vector elements, A20 and A21, are estimated with reference to FIG. 6 over a time window of (2v+1) samples centered at the event time and use the following equations:

Average Absolute Amplitude:

$$A_{20}(x, y, i, j) = \left(\frac{1}{2v+1}\right)\sum_{t=-v}^{v} |h(p+t)|$$

Root Mean Square Amplitude:

$$A_{21}(x, y, i, j) = \sqrt{\left(\frac{1}{2v+1}\right)\sum_{t=-v}^{v} h^2(p+t)}$$

Maximum Entropy Spectral Analysis (MESA) technique is published in Numerical Recipes in C, $2^{nd}$ Ed, by W. H. Press, S. A. Teukolsky, W. T. Vetterling, and B. P. Flannery, 1994, Cambridge University Press, p572–4. In the process of the present invention a $4^{th}$ order all pole model is fitted to the data in the estimation window. The complex roots of the pole provide two dominant frequencies. The frequency with the largest amplitude is the First dominant frequency F1, and that with the second largest amplitude is the Second dominant frequency F2. Vector elements, A22 and A23, express these frequencies as follows:

First Dominant Frequency F1:

$$A_{22}(x, y, i, j) = F1$$

Second Dominant Frequency F2:

$$A_{23}(x, y, i, j) = F2$$

Spatial Attributes

These attributes are calculated over a short lateral window exemplified by a (3×3) points box, 22, on the grid of FIG. 2. This box is referred in this embodiment as the horizontal matrix. In general, said matrix could be of any size with each side having an odd number, (2m+1), of points. The matrix could be a square or a rectangle, although this example shows it to be a square.

With reference to FIG. 7, the process of the invention further requires following steps:

Select an event, C, 54 on the center trace of said matrix and identify its wave packet index, i. Identify that wave packet on each neighbor trace in said matrix whose envelope peak time, A8, is closest to the envelope peak time of the center wave packet that contains C.

Define a new relative coordinate system (x', y', i', *) for wave packets such that the wave packet containing C is the relative origin (0, 0, 0, *). The '*' symbol indicates that the event index does not play any role in the calculation, which does not include the subdivision of a wave packet into component events. In said coordinate system, i'=0, for said wave packets that are in closest vertical proximity to the center wave packet. Append 'n' wave packets both above and below said wave packets in the said matrix, thus forming a matrix cube of wave packets.

Calculate the absolute difference between the k-th attribute from wave packet at (x', y', i', *) and wave packet at the relative origin and denote the difference with the symbol:

$$\delta_k(x',y',i',*) = |A_k(x',y',i',*) - A_k(0,0,0,*)|$$

Calculate $\delta_k(x',y',i',*)$: $x' \subset [-m,m], y' \subset [-m,m], i' \subset [-n,n]$, where n denotes the maximum up- and -down shift in the index above and below said wave packets that are in close vertical proximity to the center wave packet. Set m=n=1, for said matrix cube in this example.

Calculate the median, $\mu_k$, for the k-th attribute from the ordered collection of said absolute differences.

Calculate Wave Packet (WP) Dissimilarity, $$\Delta_{WP}(x',y',i',*) = \sum_{k=7}^{15} \delta_k(x',y',i',*)/\mu_k : \mu_k \neq 0$$

If $$\mu_k=0,$$

then set, $$\mu_k=1.0$$

Although the attribute subset identified by: k=7, ..., 15 has been used in the above equation, the choice is flexible and the user selects those attributes that he or she considers most sensitive to measure similarity in a given type of data. Find among vertically disposed wave packets on each trace the index $\hat{i}$ of the wave packet with the minimum WP Dissimilarity, implying that the wave packet in that vertical window is most similar to center wave packet in the center window. FIG. 7 shows a matrix cube, 50, of events contained within the most similar wave packet on each trace.

Repeat the above procedure to calculate minimum Event Dissimilarity (relative to the center trace event C, 54) for all events in said most similar wave packets. The event index, j', in the relative coordinate system will no longer be irrelevant, since each wave packet has now been decomposed into component events, which depend upon j'.

Calculate Event (EV) Dissimilarity using the same equation as for said WP Dissimilarity but with a different set of interactively selected attributes, $$\Delta_{EV}(x',y',\hat{i}',j') = \sum_k \delta_k(x',y',\hat{i}',j')/\mu_k : \mu_k \neq 0,$$

where k depends on the identity of attributes in said attribute selection. Set $$\mu_k=1.0$$

if it is zero.

Figure 8:
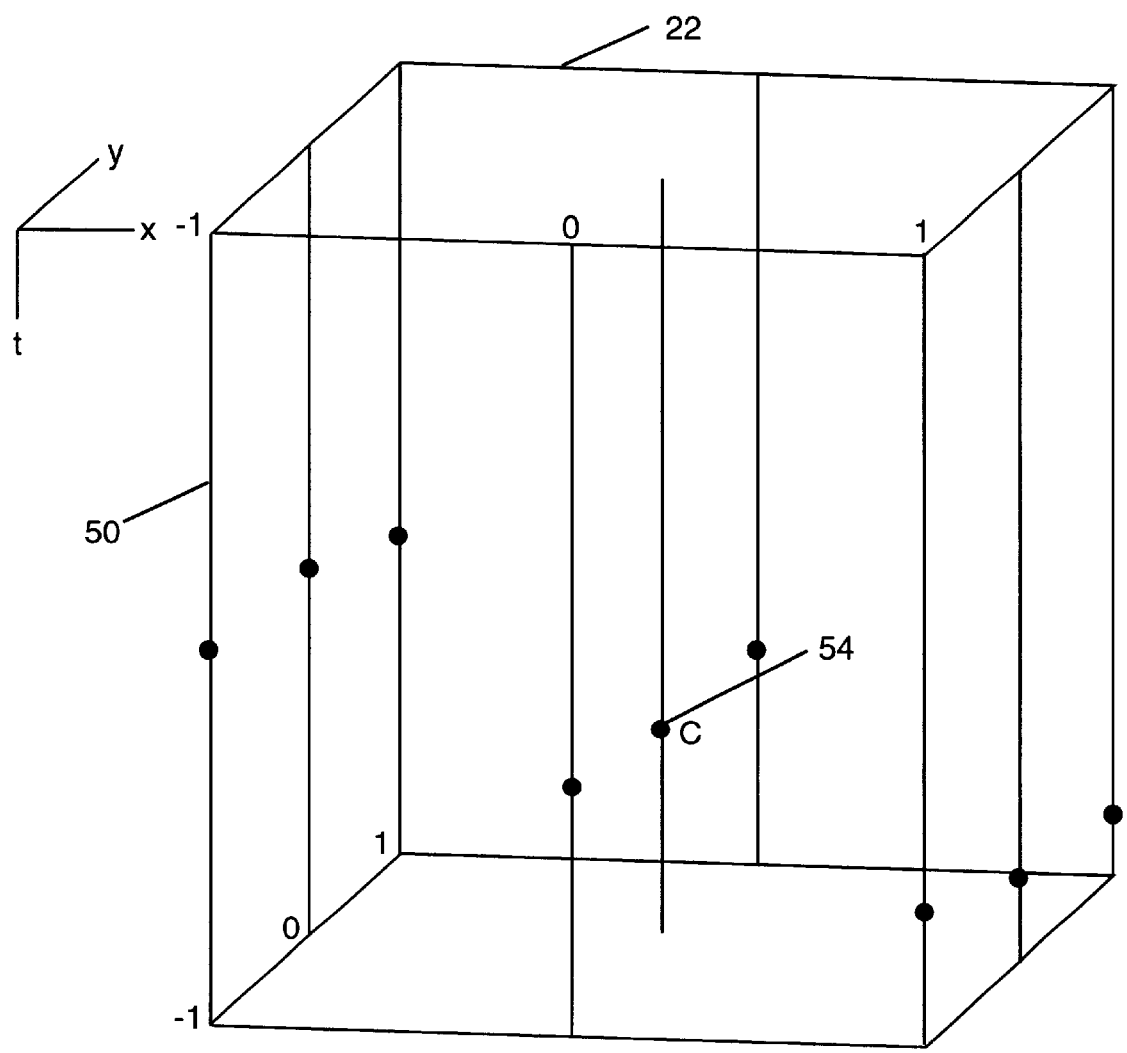
FIG. 8. depicts a subset of events, one from each of the signal traces in FIG. 7, that are most similar to the center event C, and showing their location in the matrix cube, 50, of FIG. 7.

As in the case of wave packets, find on each trace the index, $$\hat{j}'$$

of the event which has the minimum EV Dissimilarity, implying that the event is most similar to the center event, C. FIG. 8 shows said most similar events.

Select a first pair of events in laterally orthogonal directions radiating from C. Pass the unique plane through said events and C. Extrapolate the plane to intersect all traces in said matrix cube 50.

Calculate the absolute time difference, $$dt(x',y',\hat{i}',\hat{j}')$$

between the extrapolated time and time of the nearest event on that trace.

Calculate the product, $$\Delta_{EV}(x',y',\hat{i}',\hat{j}')*dt(x',y',\hat{i}',\hat{j}')$$

and exclude a user selected number of events that have the largest product value.

Fit a least squares plane through the center event, 54, and events that survived said exclusion. Sum the said product over all included events. Designate the sum as Pair Surface Error.

Repeat the process for all possible combinations of orthogonal directions in said horizontal matrix. Select the pair with the smallest Pair Surface Error, and designate it as Event Surface Error.

Figure 9:
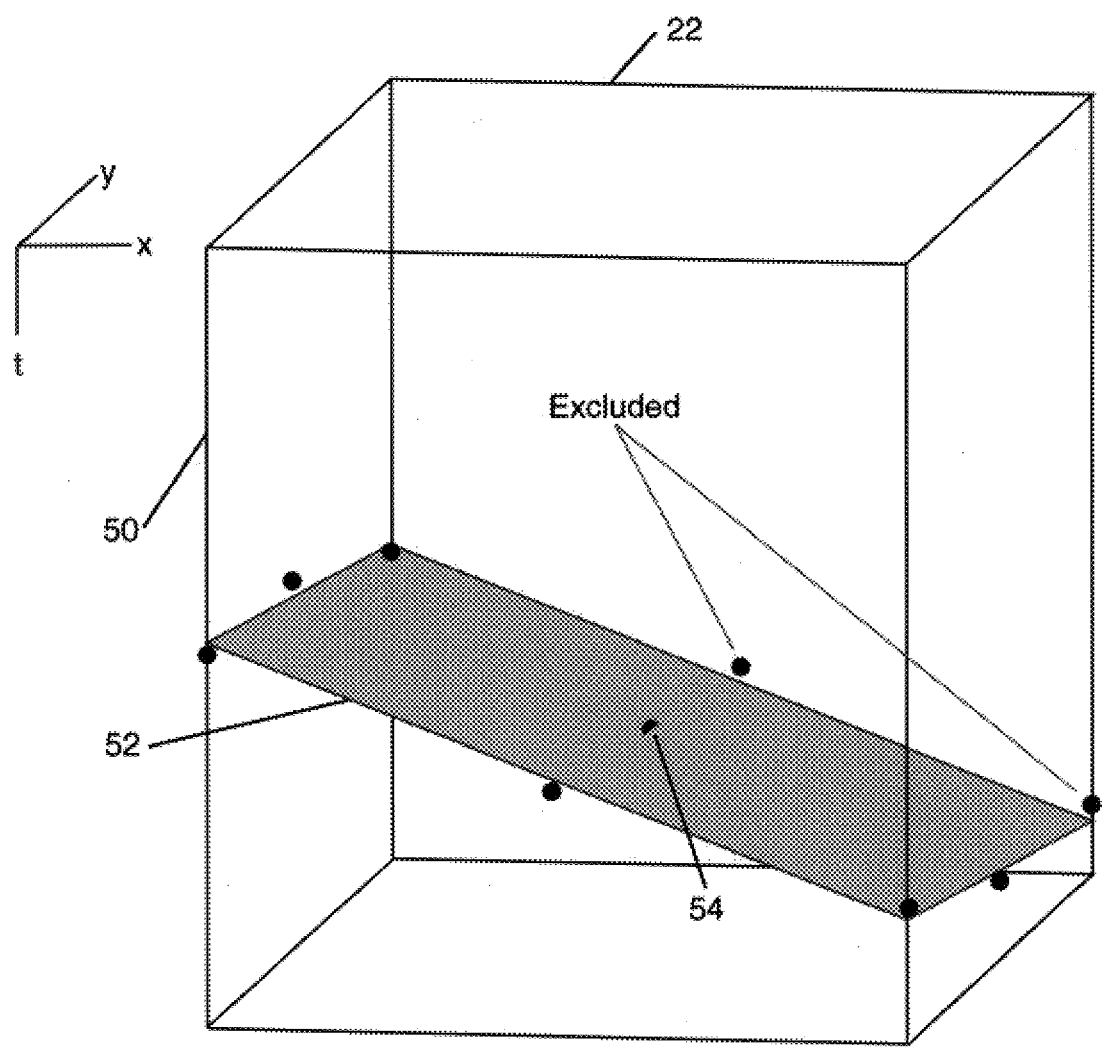
FIG. 9. shows the plane, within the matrix cube, 50, which passes through the center event C, 54, and minimizes the sum of squared time differences at other most similar events shown in FIG. 8, but excludes two events with the largest values of absolute time misalignament and Event Dissimilarity.

FIG. 9 shows the final plane, 52, called the local wavefront, corresponding to Event Surface Error, where two events from the subset in FIG. 8 have been excluded. The plane corresponding to Event Surface Error provides the following spatial attributes:

x-dip of the event:

$A_{24}(x,y,i,j)$=x-gradient of the fitted plane y-dip of the event:

$A_{25}(x,y,i,j)$=y-gradient of the fitted plane, the misfit error statistics parameter, Event Surface Error:

$A_{26}(x,y,i,j)$ and the normalized time gradient to the local wavefront, which is the normalized vector of x-dip and y-dip elements.

Attribute Thresholding and Combination

Figure 10:
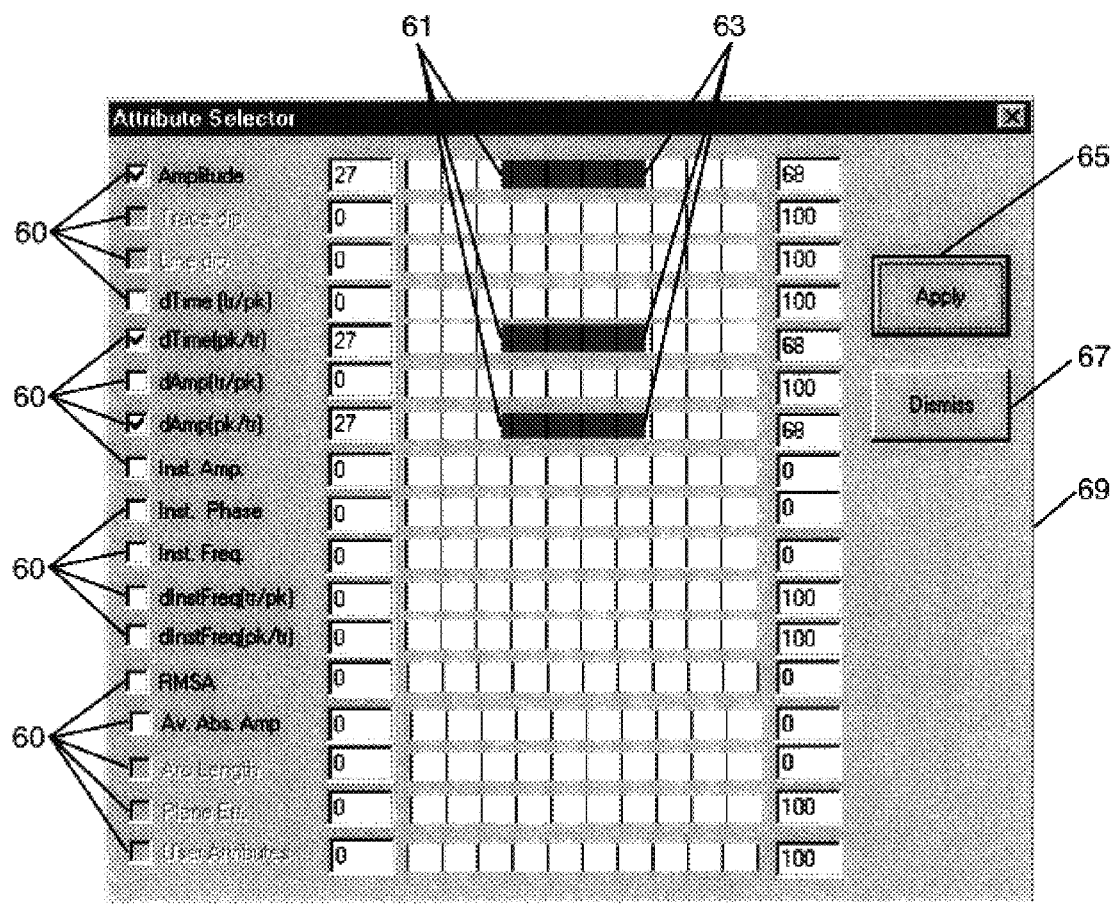
FIG. 10. is a graphical user interface to set attribute thresholds, combine resulting attributes into a scalar function, and map the maximum to minimum range of the function onto a color spectrum.

FIG. 10 shows the graphical user interface for thresholding and combination of attributes. First, each attribute is normalized between 0 and 100. An attribute is included in the analysis by checking the box on the left. The left-mouse button sets the lower limit and the right-mouse the upper limit of the threshold. The selected range appears as a red bar. Each thresholded attribute may be mapped individually onto a color spectrum, which is either the default rainbow color or one designed by the user. Events with attribute values falling outside selected threshold are excluded from further processing.

A plurality of thresholded attributes may be combined into a single scalar functional by checking appropriate attribute boxes on the left. The combination method includes the spatial operations, for example, integration over a space or time interval, logical operations, e.g. OR, AND, NOR, NAND, etc., arithmetic operations such as Min, Max, Arithmetic Mean, Median, or morphological operations, e.g., Dilations, Erosions, Openings, and Closings, etc. The normalized scalar functional, called indicator functional, may be mapped onto a color spectrum in a manner similar to the mapping of normalized individual attributes. The process of thresholding and combination is interactively varied to create a classified subset of all the events in the volume wherein the classification produces a visually recognizable target on the computer screen with excluded events being transparent.

3-D Visualization

Histogram filtering further enhances the transparency tool. A histogram of said indicator functional is calculated for all events that pass said classification by the thresholding and combination process. By selecting a threshold of the histogram, certain unwanted color regions may be excluded and made transparent in the display. While the zoom, animation, rotation, translation, panning etc. are standard tools available on a computer graphics workstation, this invention provides an important tool to integrate an indicator functional over a selected small 3-D window and move the window in a preferred direction to scan the volume. For example, the integration interval may be a slab of small thickness, dx, dy, or dt, cut parallel to the x-, y-, or t-axis. When the slab is animated, in a direction parallel to the axis of integration, potential targets move in and out of view as the slab passes through different segments of the volume. Another example of integration window is to cut out of the total volume a small pie-shaped angular segment that is pivoted on the x-, y, or t-axis. Integration is done along expanding arcs radiating outwards from the axis. In this case the animation is a rotation about the pivotal axis, which provides a radar scan view of potential targets in the volume. Yet another example of integration window is a volume segment in the line of sight between the viewer and the cube in a perspective view. The animation mode in this case is that of both translation and rotation in a perspective view. The technique of combining integration with motion provides very rapid volume scanning of structural and stratigraphic features that are difficult to comprehend with conventional time-slice or vertical section animation.

EXAMPLE

Very significant results have been obtained with the use of integration followed by animation. The color panel 62 in FIG. 11 displays the result of vertical integration of an indicator functional, combining three attributes, over 914–922 millisecond time interval. It clearly shows the outline of a buried river channel with its stratigraphic compartments separated in color. Individual time slices of conventional seismic data over the same vertical interval are shown in gray scale panels. It is obvious that the entire channel could not have been comprehended from time slices alone due to structural relief along the channel course. Indeed, the channel was first seen with the method of this invention and then searched for on time slices.

Figure 12:
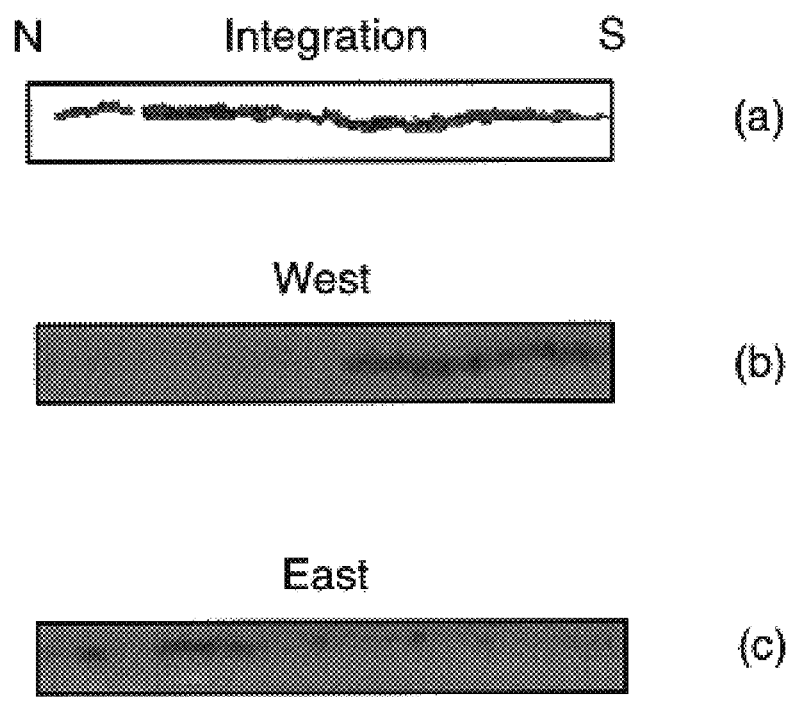
FIG. 12(a) is a vertical cross-section in the N-S direction through the river channel defined in FIGS. 11(a)–11(f)

FIG. 12(*a*) displays a vertical cross-section of the result of horizontal integration over the W-E extent of the channel as viewed from the western face. FIG. 12(*b*) displays an equivalent seismic section of the western face, and FIG. 12(*c*) displays the eastern face, but both faces are viewed from the west. The clarity and resolution of the channel course topography in the N-S direction is obvious in FIG. 12(*a*) but barely recognizable in conventional seismic displays of FIGS. 12(*b*) and 12(*c*).

FIG. 13 displays a perspective view of the channel with the blue background removed via histogram filtering. It clearly shows both the structural variation such as faults and also the stratigraphic compartments in color.

The operation to calculate attributes from a 128 Mbyte seismic data volume, classify events, scan the volume and capture results shown in these figures took 10 minutes after data loading on a 300 MHz Intel Pentium based PC workstation operating under Microsoft Windows 95. More significantly, the method provided high resolution in both the horizontal and vertical directions, and in the perspective view the entire channel was easily comprehended along with the variation of property along the course of the channel. These figures compare results obtained from this invention with those from conventional methods. In conclusion, the invention provides speed, high resolution, and easy comprehension of subtle details of 3-D bodies buried in volumes of seismic data.

The method of this invention allows the user within minutes of data loading to identify the structure and stratigraphy of potential hydrocarbon reserves and start building a 3-D model of hydrocarbon reservoir. Aside from speed, the process provides high resolution both vertically and horizontally. It saves the labor required in horizon seeding, editing and mapping practiced by conventional methods. It enables the user to explore detailed compartments of the target body in a 'what if' sense with a unified procedure to combine multiple attributes, but requiring only modest computer memory and storage resources.

What is claimed is:

1. A computer-aided method to explore, locate, and identify structural and stratigraphic features in the earth's subsurface, by processing digitized multi-dimensional seismic waveform data formatted as a plurality of time-scale or depth-scale traces wherein the data are gathered from a corresponding plurality of data measurement stations distributed in a grid pattern over a geographic region of survey, said method comprising the steps of:

a) identifying on each said trace a plurality of events, wherein an event is the occurrence of a specified phase of the waveform and associating each event with the location (x, y) of the trace in the grid and the time of occurrence 't' of the event;

b) deriving temporal attributes for each event, wherein temporal attributes are parameters that characterize the waveform in a short time window containing the event and wherein said parameters include a subset that reconstructs an approximation to the input trace in said time window;

c) identifying in a small spatial subvolume that event on each laterally separated trace whose temporal attribute set is numerically most similar to the temporal attribute set of the event at the center of said subvolume;

d) estimating a local wavefront, wherein a local wavefront is an approximating surface that passes exactly through the time of the center event and best fits times of most similar events on laterally separated traces in said subvolume and further calculating normalized parameters of said local wavefront and normalized parameters of time misfit error statistics, for example, the mean and variance of time residuals averaged over most similar events;

e) estimating a local attribute surface for each attribute wherein said local attribute surface passes exactly through the attribute at the center event and best fits attributes of events that lie in closest proximity to said local wavefront in said subvolume and further calculating normalized parameters of said local attribute surface and normalized parameters of attribute misfit error statistics; and f) creating a superset of N attributes that include normalized attributes derived in steps b), d), and e), and associating said superset with the event location (x, y, t), thus mapping a 3-dimensional event into a point in N-dimensional attribute space.

2. A computer-aided method to explore, locate, and identify structural and stratigraphic features in the earth's subsurface by processing digitized multi-dimensional seismic waveform data formatted as a plurality of time-scale or depth-scale traces as set forth in claim 1, with further steps to identify similar events through the use of similar wave packets, said further steps comprising:

g) segmenting input traces into vertically contiguous time windows of wave packets, wherein a wave packet is the portion of input trace that is contained between consecutive minima of Instantaneous Envelope function derived from input trace and its Hilbert Transform;

h) deriving for each wave packet a plurality of temporal attributes which characterize the wave packet, including those attributes with which to reconstruct said wave packet;

i) identifying in said wave packet the time locations of events, wherein an event is the occurrence of a specified phase or a recognizable feature of input trace;

j) calculating a set of temporal attributes for each event, in addition to those attributes that the event inherits from its wave packet, and associating said attributes with a point in 3-D space identified by the grid location (x, y) of the trace and the time 't' of the event;

k) combining normalized attribute differences, between wave packets on laterally separated traces within a small subvolume and a central wave packet, into a scalar mathematical functional to measure Wave Packet Dissimilarity wherein the least Wave Packet Dissimilarity implies most similar wave packet;

l) selecting one wave packet on each trace, by vertical scanning in said spatial subvolume, that is most similar to the central wave packet;

m) combining normalized attribute differences, between events on spatially separated most similar wave packets and an event on center wave packet, into a scalar mathematical functional to measure Event Dissimilarity wherein the least Event Dissimilarity implies most similar event;

n) selecting one event on each trace, by vertical scanning most similar wave packets in said spatial subvolume, that is most similar to center event;

o) selecting from the set of most similar events a specified number of events which are among those with smallest Event Dissimilarity.

3. A computer-aided method to explore, locate, and identify structural and stratigraphic features in the earth's subsurface, by processing digitized multi-dimensional seismic waveform data formatted as a plurality of time-scale or depth-scale traces as set forth in claim 1, said method further providing event classification by:

p) selecting, thresholding and combining, as desired, any subset of the superset of N normalized attributes of said events into one or more indicator functionals; and q) mapping first indicator functional value range onto a color spectrum and, if desired, a second indicator functional value range onto varying tones of audio-frequency and a third indicator functional value range onto a volume range of sound with the result automatically displaying the locus of events in 3-dimensions to define the geometrical structure, the color variation to identify stratigraphic compartments within said structure, and the sound tone and volume from a specific event indicating two other properties of the desired target.

4. A computer-aided method to explore, locate, and identify structural and stratigraphic features in the earth's subsurface, by processing digitized multi-dimensional seismic waveform data formatted as a plurality of time-scale or depth-scale traces as set forth in claim 1, said method further providing the step of:

r) integrating said indicator functional over a small 3-D window and animating the window in a desired direction to scan the volume and comprehend the directional sensitivity of anomalies in the scanned view.

5. A computer-aided method to explore, locate, and identify structural and stratigraphic features in the earth's subsurface, by processing digitized multi-dimensional seismic waveform data formatted as a plurality of time-scale or depth-scale traces as set forth in claim 1, said method providing the capability to point with a cursor in a 3-D subvolume to locate a target that has been high-graded through applications of methods in preceding claims, capture its three-dimensional shape coordinates and internal properties and save the result on an archival medium such as magnetic tape, optical disk, digital video disk (DVD) or display the result on paper sections.

6. A computer-aided method to explore, locate, and identify the shape and property variations of anomalous objects embedded in a complex opaque medium, by processing digitized multi-dimensional remotely sensed waveform data formatted as a plurality of time-scale or depth-scale traces wherein the data are gathered from a corresponding plurality of data measurement stations distributed in a grid pattern over a region of survey, said method comprising the steps of:

a) identifying on each said trace a plurality of events, wherein an event is the occurrence of a specified phase of the waveform and associating each event with the location (x, y) of the trace in the grid and the time of occurrence 't' of the event;

b) deriving temporal attributes for each event, wherein temporal attributes are parameters that characterize the waveform in a short time window containing the event and wherein said parameters include a subset that reconstructs an approximation to the input trace in said time window;

c) identifying in a small spatial subvolume that event on each laterally separated trace whose temporal attribute set is numerically most similar to the temporal attribute set of the event at the center of said subvolume;

d) estimating a local wavefront, wherein a local wavefront is an approximating surface that passes exactly through the time of the center event and best fits times of most similar events on laterally separated traces in said subvolume and further calculating normalized parameters of said local wavefront and normalized parameters of time misfit error statistics, for example, the mean and variance of time residuals averaged over most similar events;

e) estimating a local attribute surface for each attribute wherein said local attribute surface passes exactly through the attribute at the center event and best fits attributes of events that lie in closest proximity to said local wavefront in said subvolume and further calculating normalized parameters of said local attribute surface and normalized parameters of attribute misfit error statistics; and f) creating a superset of N attributes that include normalized attributes derived in steps b), d), and e), and associating said superset with the event location (x, y, t), thus mapping a 3-dimensional event into a point in N-dimensional space.

7. The method of claim 6, wherein steps a) and b) for the selections of the event time and its time window are replaced by the steps of:

g) identifying on each said trace a plurality of events, wherein an event is the occurrence of a maximum of the instantaneous envelope function derived from the waveform and its Hilbert transform and associating each event with the location (x, y) of the trace in the grid and the time of occurrence 't' of the event;

h) deriving temporal attributes for each event, wherein temporal attributes are parameters that characterize the waveform in a time window that starts at the minimum of instantaneous envelope function which precedes the time of the event and ends at the minimum of instantaneous envelope function which follows the time of the event and wherein said parameters include a subset that reconstructs an approximation to the input traces in said time window.

* * * * *